United States Patent [19]

Aoyama

[11] Patent Number: 5,199,854
[45] Date of Patent: Apr. 6, 1993

[54] HYDRAULIC SUPPLY ARRANGEMENT FOR USE WITH ACTIVE AUTOMOTIVE SUSPENSION OR THE LIKE

[75] Inventor: Yutaka Aoyama, Odawara, Japan

[73] Assignee: Nissan Motor Co., Ltd., Yokohama, Japan

[21] Appl. No.: 740,384

[22] Filed: Aug. 5, 1991

[30] Foreign Application Priority Data

Aug. 8, 1990 [JP] Japan .................................. 2-211394
Aug. 17, 1990 [JP] Japan .................................. 2-217948
Aug. 17, 1990 [JP] Japan .................................. 2-217949

[51] Int. Cl.⁵ .......................................... F04B 49/06
[52] U.S. Cl. .................................. 417/282; 417/288;
  417/292; 417/300; 417/428; 417/287; 280/707;
  280/714
[58] Field of Search ............... 417/286, 287, 288, 290,
  417/292, 300, 428, 282; 280/707, 714

[56] References Cited

U.S. PATENT DOCUMENTS

| 4,848,790 | 7/1989 | Fukunaga et al. | 417/3 |
| 5,083,811 | 1/1992 | Sato et al. | 280/714 |
| 5,085,459 | 2/1992 | Sato et al. | 280/714 |

FOREIGN PATENT DOCUMENTS 57-176375 10/1982 Japan .
63-251313 10/1988 Japan .
2-123284 5/1990 Japan .

Primary Examiner—Richard A. Bertsch
Assistant Examiner—David W. Scheuermann
Attorney, Agent, or Firm—Lowe, Price, Leblanc & Becker

[57] ABSTRACT

The first of two serially arranged electromagnetically operated spool type drain control valves is conditioned to select the drain passage of smaller the pump before the second valve is moved from its closed or communication cut-off position, to its open position wherein hydraulic fluid can be drained therethrough, whereby the spool of the second valve is exposed to a relatively small flow generated force which acts thereon and which tends to move the valve spool toward to its closed position. In another embodiment the hydraulic fluid temperature is monitored and used to modify the control schedule via which the switching of the drain control valves is determined. A further embodiment monitors a parameter which is indicative of the prime mover rotational speed and inhibits the closure of the second of the two valves when the rotational speed is above a predetermined limit.

7 Claims, 12 Drawing Sheets

HYDRAULIC SUPPLY ARRANGEMENT FOR USE WITH ACTIVE AUTOMOTIVE SUSPENSION OR THE LIKE

BACKGROUND OF THE INVENTION

1. Field of the Invention

The present invention relates generally to a source of hydraulic fluid under pressure via which hydraulically operated devices such as active suspensions and the like are operated and more specifically to such an arrangement which permits the size of the switching valve associated with a dual pump system to be reduced in size.

2. Description of the Prior Art

JP-A-2-123284 discloses a hydraulic fluid supply arrangement which includes two separate pumps, one having a larger displacement capacity than the other. Each of the pumps is arranged to discharge fluid under pressure into separate discharge passages in which respective first and second check valves are disposed. The two discharge passages merge into a single supply passage or conduit at a point downstream of the check valves.

In order to control the amount of fluid which is discharged into the supply passage, a drain control valve arrangement is operatively disposed in two drain passages which respectively lead from the first and second discharge passages at locations upstream of the check valves, and is arranged to selectively determine the amount of fluid which is permitted to drain back to a reservoir from which the pumps induct.

The drain control valve arrangement can be conditioned to assume a first state (mode 1) wherein the drain passage which is associated with the larger of the two pumps is open and the drain passage which is associated with the smaller of the two, is closed; a second state (mode 2) wherein the drain which is associated with the smaller is open and that associated with the larger pump is closed; and a third state (mode 3) wherein both of the drain passages are closed. Accordingly, in mode 1 only the discharge of the small pump is output while in mode 2 the output of the small pump is drained and replaced with that of the larger one. In mode 3 the combined discharge of both pumps is output (both drains being closed).

The drain control valve arrangement can consist of two serially arranged solenoid operated valves. The first and upstream valve is fluidly communicated with the two drain conduits and is such as to select the drain conduit of the larger pump when de-energized and to switch to the drain conduit of the smaller pump when energized. On the other hand, the second and downstream valve is arranged to determine if the drain passage selected by the first upstream valve is to be permitted to communicate with the reservoir or not. In this instance, this second valve is arranged to establish communication between the first valve and the reservoir when energized. In other words, the first valve is used to determine which of modes 1 and 2 is employed while the second valve induces mode 3 when de-energized.

However, this arrangement is such that, when the spool of the second valve arrangement is moved from its communication cut-off position to the one wherein draining is permitted, the flow of hydraulic fluid through the valve produces a force which tends to move the valve spool back toward its communication cut-off position. Accordingly, as the spring is used to bias the valve spool toward its cut-off position, the solenoid must be able to produce a sufficient force to overcome both the spring and the force produced by the flow of hydraulic fluid through the valve in order to be able to move the spool.

With the prior art arrangement, depending on the state of the first valve arrangement and the conditions to which the system is subjected, upon the second valve arrangement being switched to a position wherein drainage is permitted, it is possible for the spool of the second valve arrangement can be exposed to the flow produced by the larger of the two pumps. As this relatively large flow produces a force larger than produced that by the output of the smaller of the two pumps, it is necessary to provide a solenoid which can definitely produce a sufficient force to move the spool against the spring force and the relatively large force produced by the large flow to the position wherein the valve is open and drainage is permitted.

This of course induces the drawback that this relatively large solenoid, which is capable of overcoming the maximum resistance to spool movement which is apt to be encountered during system operation, increases the overall bulk, weight and cost of the drain control valve.

A further drawback which has been encountered with the above type of arrangement is that the temperature of the hydraulic fluid is not taken into consideration. As the temperature of the hydraulic fluid varies, the discharge characteristics of the pumps vary along with the control characteristics of the device which is motivated by the supply of hydraulic fluid under pressure.

Another problem which has been encountered with the above type of arrangement is that when the pumps are driven by a belt or similar type of connection with the engine crankshaft at high engine speeds, upon the drain control arrangement being conditioned to stop the draining of both pumps, the resistance to rotation which is exhibited by the pumps sometimes leads to a situation wherein driven connection (e.g. belt) slippage occurs.

SUMMARY OF THE INVENTION

It is an object of the present invention to provide a control system for a dual pump system which enables a drain valve arrangement of the above-disclosed nature to be controlled in a manner wherein the overall size of the drain control valve arrangement can be reduced.

It is a further object of the present invention to provide a control system which is responsive to hydraulic fluid temperature and which improves the control of the system in a manner which prevents the supply of inappropriate amounts of hydraulic fluid fluid and the waste of prime mover power.

A further object of the present invention is to provide a control system which is responsive to the rotational speed of the prime mover and which inhibits the drainage of both pumps from being stopped under predetermined conditions and thus obviates the problem wherein belt slippage and the like type of pump drive connection related type of problem is encountered.

In brief, the first object is achieved by an arrangement wherein the first of the two valves is conditioned to select the drain passage of the smaller pump before the second valve is moved from its closed or communication cut-off position to its open position wherein hydraulic fluid can be drained therethrough. This of course ensures that the solenoid need only be capable of overcoming the force of the spring plus the force which is produced by the smaller of the two flows (pump discharges) which tends to move the valve spool toward to its closed position. As the larger pump can have a displacement which is appropriately twice that of the smaller one, the reduction in solenoid size which can be achieved, is substantial.

The second object of the invention is achieved by monitoring the hydraulic fluid temperature and modifying the control schedule via which the switching of the drain control valves is determined.

The third object is achieved by monitoring a parameter which is indicative of the prime mover rotational speed and inhibiting the closure of the second of the two valves in a manner which ensures that drainage of one of the two pump discharges will occur during a mode of operation wherein the rotational speed of the prime mover is found to be above a predetermined limit.

More specifically, in a first preferred aspect of the present invention there is provided a source of hydraulic fluid under pressure, comprising: a first pump; a first supply passage which is associated with the first pump and which receives the discharge thereof; a first check valve disposed the first supply passage; a second pump which has a smaller capacity than the first pump; a second supply passage which is associated with the second pump and which receives the discharge thereof; a second check valve disposed in the second supply passage; a first drain passage which leads from the first supply passage at a location between the first pump and the first check valve; a second drain passage which leads from the second supply passage at a location between the second pump and the second check valve; drain passage control means for controlling the communication between the first and second drain passages and a reservoir; the drain passage control means including first and second valves, the first valve being connected with the first and second drain passages and the second valve being fluidly interposed between the first valve and a reservoir, the first valve having a first state wherein the first drain passage is open and the second drain passage is cut-off, and a second state wherein the first passage is cut-off and the second drain passage is open, the second valve having a first state wherein communication between the first valve and the reservoir is permitted and a second position wherein communication between the first valve and the reservoir is cut-off; and valve control means operatively connected with the first and second valves, the valve control means conditioning the first valve to assume its second state before the second valve is switched from its second state to its first state.

A second aspect of the present invention provides a source of hydraulic fluid under pressure, comprising: a first pump; a second pump, the second pump having a discharge capacity which is less than that of the first pump; a first discharge passage into which the first pump discharges its output; a second discharge passage into which the second pump discharges its output; a supply conduit which fluidly communicates with the first and second discharge passages; a first drain passage which communicates with the first discharge passage at a location upstream of a first check valve which is disposed in the first discharge passage at a location upstream of the supply conduit; a second drain passage which communicates with the second discharge passage at a location upstream of a second check valve which is disposed in the second discharge passage at a location upstream of the supply conduit; a first spool valve which fluidly communicates with the first and second drain passages, the first spool valve having a first drain port; a second spool valve fluidly communicated with the discharge port of the first spool valve, the second spool valve having a second drain port; the first valve having a first spool which can assume a first position in which communication between the first drain passage and the first drain port is established and a second position wherein communication between the second drain passage and the first drain port is established, the second valve having a second spool which can assume a first position wherein communication between the first and second drain ports is established and a second position wherein communication between the first and second drain ports is cut-off; hydraulic fluid requirement sensor means; a temperature sensor for sensing the temperature of the hydraulic fluid; and control means which is operatively connected with the first and second spool valves for controlling the positions of the first and second spools, the control means including means for determining the amount of hydraulic fluid which is required to be supplied into the supply conduit from the first and second pumps, based on the input from the hydraulic fluid requirement sensor means and the temperature sensor; and means for conditioning the first and second valves in accordance with the determined amount of hydraulic fluid required.

A third aspect of the present invention provides a source of hydraulic fluid under pressure, comprising: a first pump; a second pump, the second pump having a discharge capacity which is less than that of the first pump; a first discharge passage into which the first pump discharges its output; a second discharge passage into which the second pump discharges its output; a supply conduit which fluidly communicates with the first and second discharge passages; a first drain passage which communicates with the first discharge passage at a location upstream of a first check valve which is disposed in the first discharge passage at a location upstream of the supply conduit; a second drain passage which communicates with the second discharge passage at a location upstream of a second check valve which is disposed in the second discharge passage at a location upstream of the supply conduit; a first spool valve which fluidly communicates with the first and second drain passages, the first spool valve having a first drain port; a second spool valve fluidly communicated with the discharge port of the first spool valve, the second spool valve having a second drain port; the first valve having a first spool which can assume a first position in which communication between the first drain passage and the first drain port is established and a second position wherein communication between the second drain passage and the first drain port is established, the second valve having a second spool which can assume a first position wherein communication between the first and second drain ports is established and a second position wherein communication between the first and second drain ports is cut-off; drive means for operatively connecting a prime mover with the first and second pumps; and means for sensing a rotational speed indicative of the rotational speed of one of the pump and the prime mover; control means which is responsive to the sensed rotational speed for preventing the second spool from being moved to its second position when the rotational speed is above a predetermined level.

DETAILED DESCRIPTION OF THE PREFERRED EMBODIMENTS

The embodiments of the present invention will be disclosed in combination with an active vehicle suspension which utilizes the outputs of forward and lateral accelerometers to control the pressure selectively applied to hydraulic cylinders of a vehicle suspension in a manner which attenuates/prevents pitching, rolling and the like. It should be noted that the present invention is not limited to use with vehicle suspensions and can find application in a variety of other types of hydraulically motivated arrangements/devices.

Figure 1:
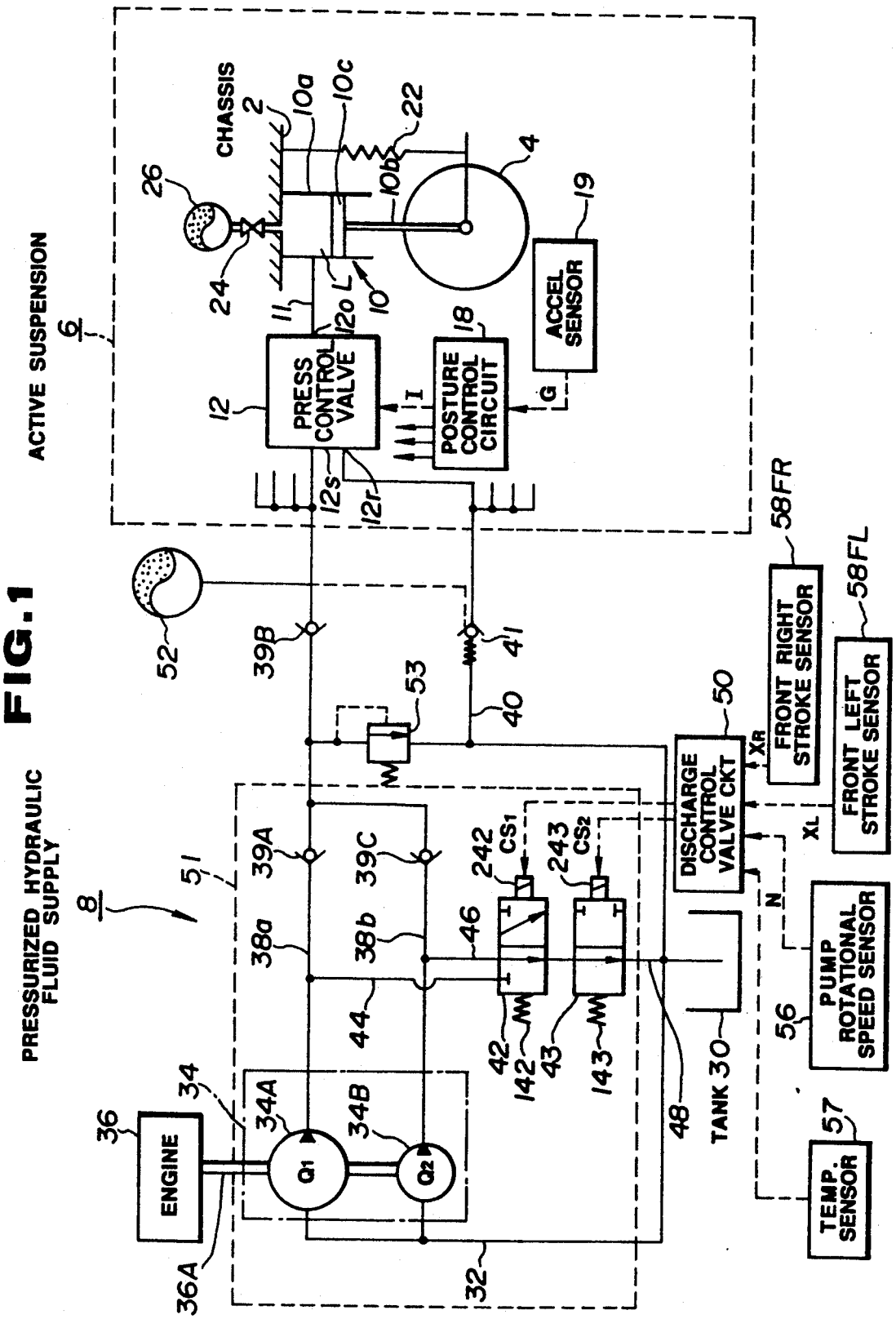
FIG. 1 is a schematic diagram showing a hydraulic fluid supply arrangement to which the instant invention is applied combined with an active automotive suspension arrangement.

As shown in FIG. 1, a vehicle chassis 2 is operatively connected with road wheel(s) 4 by way of active suspension arrangement(s) (generally denoted by the numeral 6) which is powered by a source of hydraulic fluid under pressure (generally denoted by the numeral 8). Note that for the sake of illustrative simplicity only one of the plurality of suspension arrangement is shown.

Each of the active suspensions 6 includes a hydraulic cylinder 10 and a pressure control valve 12, while they share a posture control circuit 18 and an accelerometer arrangement 19. The hydraulic cylinder(s) 10 each include a cylinder tube 10a which is connected to the vehicle chassis and a piston rod 10b which is connected with the road wheel 4. A piston 10c is connected to one end of the piston rod 10b and reciprocatively received in the cylinder tube 10a in a manner to define a variable volume pressure chamber L. This chamber L is connected to a port 12o of the pressure control valve 12 by way of a conduit 11.

Figure 2:
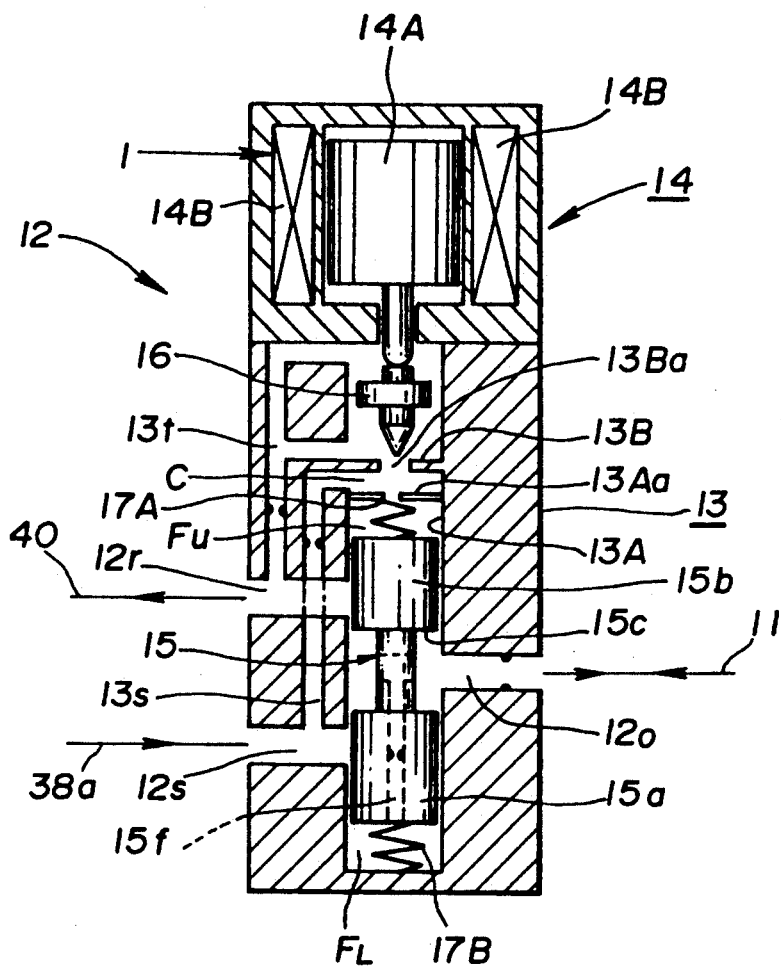
FIG. 2 is a sectional view of a pressure control valve which forms part of the system shown in FIG. 1.

An example of the pressure control valve 12 is shown in FIG. 2. As will be appreciated, this valve includes a cylindrically shaped housing 13, a solenoid device 14 which is fixedly connected to the housing in a manner to be essentially integral therewith. The central portion of the housing is formed with an axial bore 13A in which a main spool 15 and a poppet valve member 16 are disposed. The axial ends of the spool 15 are exposed to pilot pressure chamber $F_U$ and a feedback chamber $F_L$. Offset springs 17A and 17B are respectively disposed in these chambers.

It should be noted that a fixed orifice 13Aa is associated with the pilot pressure chamber $F_U$. The main spool 15 is formed with first and second lands 15a and 15b in a manner which defines a pressure control chamber 15c therebetween. The valve body 13 is formed with a supply port 12s, a drain port 12r and the previously mentioned pressure output port 12o. A valve seat 13B is formed in the bore 13 against which the poppet valve element 16 is engageable in a manner to define a variable orifice 13Ba. The valve seat 13B is arranged to cooperate with the fixed orifice 13Aa in a manner to define a pressure chamber C which is in constant fluid communication with the feedback chamber $F_U$. The supply port 12s communicates with the pressure chamber C by way of a transfer passage 13s while the drain port 13r is communicated with the poppet valve side of the valve seat 13B by way of transfer passage 13t. Additionally, the output port 12o fluidly communicates with the feedback chamber $F_L$ by way of an axially extending transfer passage structure 15f which is defined in the body of the spool 15.

On the other hand, the solenoid arrangement has a plunger 14A which is motivated by electromagnetic coil 14B. Depending on the level of energization of the coil 14B the plunger 14A is moved in a manner which drives the poppet valve element 16 toward the valve seat 13B and thus varies the amount of hydraulic fluid which is permitted to pass out of the chamber C and flow toward the drain port 12r and thus enables the pressure prevailing in the pilot chamber $F_U$ to be controlled.

Figure 3:
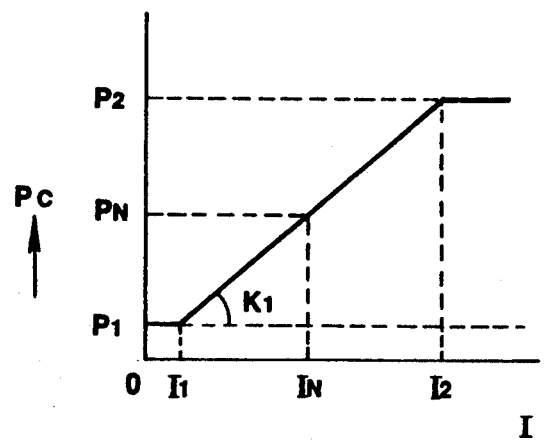
FIG. 3 is a graph showing the output characteristics of the control valve show in FIG. 2.

Depending on the amount of force which is produced by the solenoid 14 and the resulting displacement of the poppet valve element 16, the pressures prevailing in in the chambers $F_L$ and $F_U$ can be controlled in a manner wherein the spool 15 can be moved to positions wherein communication between the supply port 12s, the output port 12o and the drain port 12r can be selectively modified/cut-off. Thus, as the pressure in the chambers $F_L$ and $F_U$ is varied, the pressure modulation action of the spool 15 can be controlled to the degree that the pressure which prevails at the output port 12o can be varied in the manner indicated graphically in FIG. 3. As shown in this figure, the pressure rises to and maximizes at line pressure level.

The accelerometer arrangement 19 is arranged to output signals indicative of the lateral forward-aft and vertical accelerations of the vehicle chassis. These G signals are supplied to the posture control circuit 18 wherein they are modified with predetermined gains in a manner which enable roll pitch and the like via determining the appropriate pressures which need to be supplied the hydraulic cylinders associated with the vehicle suspension.

It will be noted at this stage that in FIG. 1, the numeral 22 denotes a coil spring which is operatively disposed between the vehicle chassis 2 and the illustrated road wheel 4; while 24 and 26 respectively denote a control valve and pressure accumulator which form vital parts of the suspension.

The source of hydraulic fluid under pressure 8 includes a tank or reservoir 30, an induction conduit 32 which leads to the induction ports of an pump arrangement 34. In this instance the pump arrangement 34 is placed in drive connection with the engine 36 of the vehicle by way of drive shaft 34A. In this instance the pump arrangement includes first and second pumps 34A and 34B each of which have plurality of cylinders and plungers. The first pump 34A is arranged to have a larger displacement than the second one.

Figure 4:
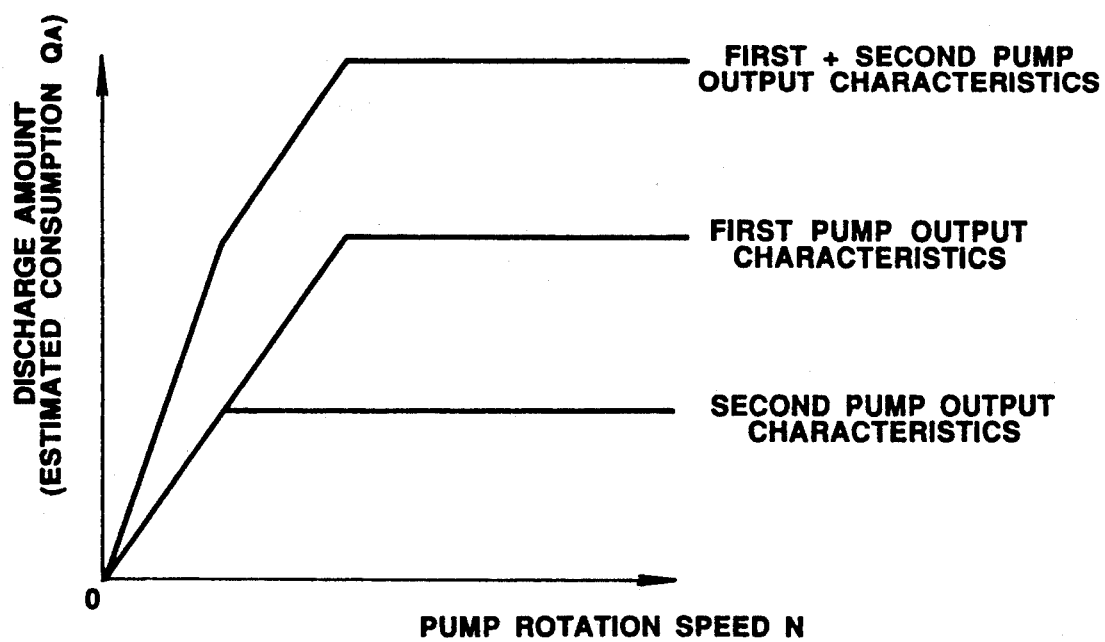
FIG. 4 is a mode control map which is used in connection with the first embodiment of the present invention.

The output characteristics of the pump arrangement is graphically shown in FIG. 4. When the demand for hydraulic fluid under pressure is high the output of both pumps are used while in the case of a small demand only the output of the second pump 34B is used. Demands intermediate of the above result in the output of the first pump 34A being utilized.

The discharge port of the first pump 34A communicates with a first supply conduit or passage 38a. This conduit communicates with the supply port 12s of each pressure control valves 12 by way of first and second check valves 39A and 39B. The drain ports 12r of each of the valves is communicated with a drain conduit 40. An operate check valve 41 is disposed in this line and arranged to be responsive to the a pilot pressure in a manner to close and cut-off the drain conduit 40 in response to the situation wherein $P_P \leq P_N$ (wherein $P_P$ denotes pilot pressure and $P_N$ denotes the pressure currently being used).

The second pump 34B is arranged such that the discharge port communicates with a second supply conduit or passage in which a second check valve 39C is disposed. As shown, this second supply conduit communicates with the first supply passage at a location intermediate of the two check valves 39A and 39B.

The source of hydraulic fluid under pressure further includes first and second spring offset type electromagnetic valves 42, 43. The first electromagnetic valve 42 communicates with a first drain conduit 44 which leads from the first supply conduit and a second drain conduit 46 which leads from the second supply conduit 38b. As shown, the first and second drain conduits 44, 46 are arranged to communicate with the first and second supply conduits 38a and 38b at locations which are respectively downstream of the check valves 39A and 39C. The discharge port of the first electromagnetic valve 42 is arranged to communicate with the reservoir 30 by way of a third drain conduit 48. The second electromagnetic valve 43 is disposed in the third drain conduit and arranged to either permit normal communication or cut-off the same.

A discharge control circuit 50 is connected with the first and second valves 42, 43 and arranged to supply ON/OFF type control signals CS1 and CS2 thereto. When the CS1 signal assumes a low OFF level, the electromagnetic valve 42 is conditioned in a manner wherein the spool of the same is moved by the bias force of a spring 142 to the position illustrated in FIG. 1 wherein the second drain conduit 46 is placed in communication with the third drain conduit 48. On the other hand, when CS1 signal assumes a high ON level, the spool of the first electromagnetic valve 42 is moved to a position by solenoid 242, leftward in FIG. 9(a), whereby communication between the drain conduits 44 and 48 is established.

On the other hand, when the CS2 signal assumes a low OFF level, the spool of the second electromagnetic valve 43 is moved to the position illustrated in FIG. 1 and the third drain conduit is thus opened and hydraulic fluid from the selected one of the first and second drain conduits 44 and 46 is placed in communication with the reservoir 30. However, when the CS2 signal assumes a high ON level, the spool of the second electromagnetic valve 43 is moved by solenoid 243, leftward in FIG. 9(c), against the bias of spring 242 associated therewith and assumes a position wherein the third drain conduit or passage is cut-off to flows via both of conduits 44 and 46.

A relatively large capacity accumulator 52 is arranged to communicate with the first supply passage 38a at a location downstream of the second check valve 39B.

A relief valve 53 which is arranged to open upon the line pressure exceeding a predetermined level is arranged to communicate with the first supply conduit 38a at a location between the first and second check valves 39A and 39B and downstream of the location where the second supply conduit 38b joins the first one. This relief valve is arranged to relieve the excess pressure into the drain conduit 40.

A pump rotational speed sensor 56, a temperature sensor 57 and front left and right stroke sensors 58FL and 58FR (which are associated with the front left and right road wheel suspension arrangements) are arranged input data to the discharge control valve circuit 50. In this case the pump rotational speed sensor 56 is arranged to respond to the rotational speed of the pump drive shaft and to produce an electrical signal N indicative of the same. More specifically, this sensor can take the form of a magnetic or optical type sensor which generates a train of pulses the frequency of which increase with rotational speed. The stroke sensors can take the form of potentiometer type arrangements and are arranged to produce displacement signals XL and XR respectively.

Figure 5:
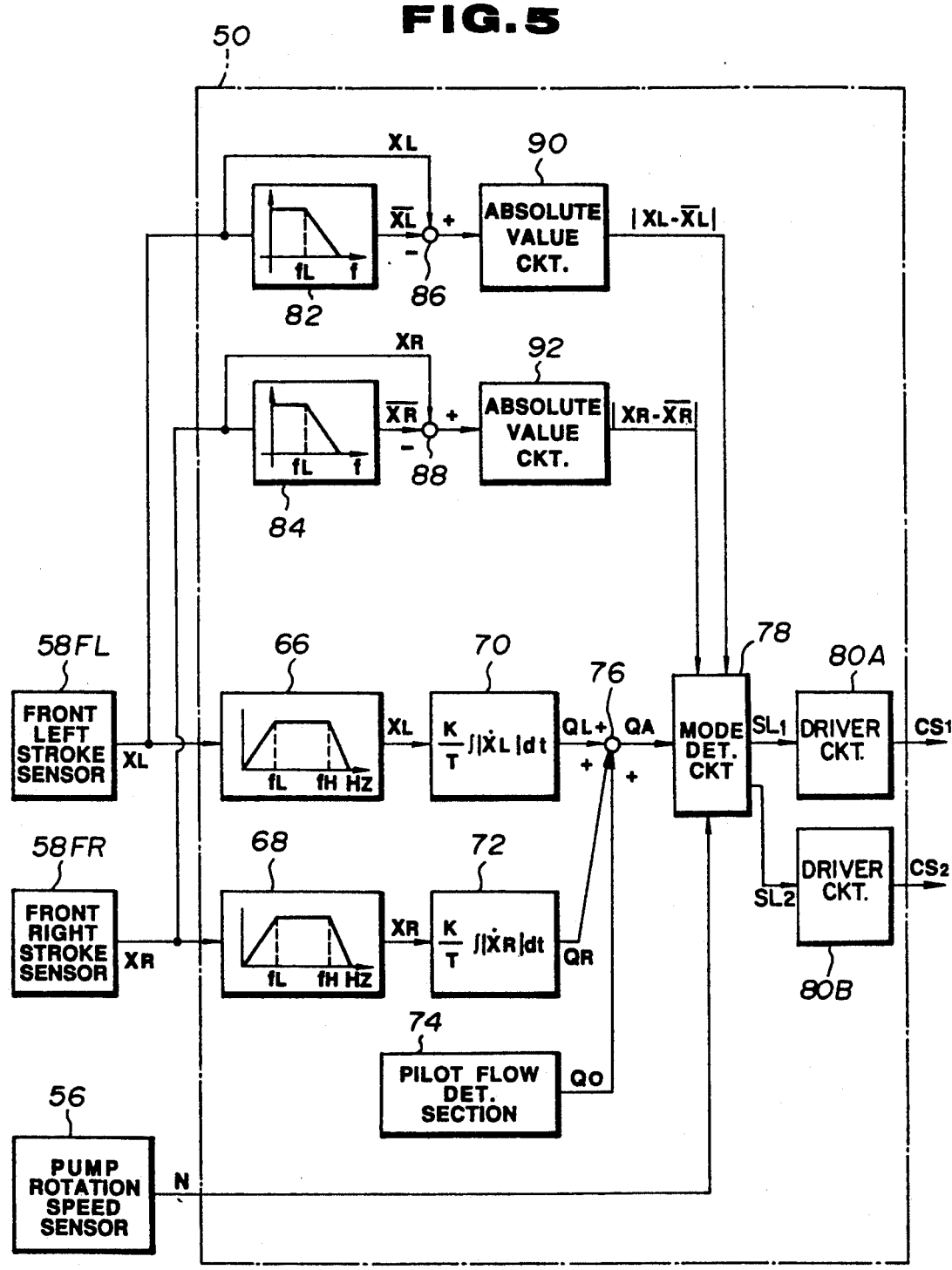
FIG. 5 is a block diagram showing the conceptual arrangement of a control circuit used in accordance with a first embodiment of the present invention.

As schematically shown in FIG. 5, the outputs XL, XR of the stroke sensors 58FL and 58FR are subject to filtering in band pass filters 66, 68 and then subject to integration in integrators 70, 72. The outputs QI, QR of the integrators 70, 72 are supplied along with a signal Qo indicative of the required flow (generated by a pilot flow determining section or circuit 74) to an adder 76. The output QA of the adder represents an estimate of the amount of hydraulic fluid which is going to be required in view of the instant operating conditions. The signal QA is used in a mode determining circuit 78 to determine which of the three modes of valve operation is required in order to relieve the appropriate amount of hydraulic fluid. Depending on the outcome of this decision, suitable command signals SL1 and SL2 are issued to driver circuits 80A and 80B to induce the CS1 and CS2 signals to assume the required levels.

In the instant embodiment the driver circuit 80A is such that when SL1 assumes a high level [1] the switching control signal CS1 assumes an ON level while in the event that SL1 assume a low level [0], the switching control signal CS1 assumes an OFF level.

On the other hand, the driver circuit 80B is such that when SL2 assumes a high level [1] the switching control signal CS2 assumes an ON level while in the event that SL2 assume a low level [0], the switching control signal CS2 assumes an OFF level.

The band pass filters 66, 68 are arranged such that the lower cut-off frequency fL is set at a value (e.g. 0.5 Hz) which enables the shut out of the change in stroke due to vehicle height adjustment; while the upper cut-off frequency is set at a value (e.g. 6 Hz) which allows the shut of the change in stroke at spring sub-resonance frequencies.

The integrators 70, 72 are arranged to treat the inputs in accordance with the following basic equation:

$$Q = \frac{K}{T} \int |\dot{x}| dt \qquad (1)$$

That is to say, the stroke change is integrated over a period T (e.g. 2 sec) so that the amount of hydraulic fluid which must be output to each cylinder can be determined based on the total stroke amount $[1/T \cdot \int |x| dt]$. In the above equation K denotes the hydraulic cylinder pressure receiving area gain.

It should be noted that in connection with the sensed relative movement which takes place between the chassis and the road wheels the movement includes both retraction and elongation. However, as will be appreciated, only during extension is it necessary to introduce hydraulic fluid under pressure from the pump arrangement. Viz., during retraction, hydraulic fluid is exhausted from the cylinders and thus does not require the supply of hydraulic fluid thereto. However, as the same situation holds for the rear wheels, the total stroke as derived using the above mentioned equation (1) can be taken as being indicative of the total stroke requirement for all four wheels.

The derivation of the pilot flow amount performed in the pilot flow determining section 74 is such as to produce a value Qo which is such as to suitably compensate for the hydraulic fluid which is lost by way of leakage in the pressure control valve 12.

By summing the QR, QL and Qo values it is possible to estimate the amount of hydraulic fluid which will be totally required by the system.

As shown in FIG. 5, the discharge control circuit 50 further includes filters 82 and 84 which receive the stroke signals XL and XR and produce average values $\overline{XL}$ and $\overline{XR}$. The low pass filters in this case are of the analog type and are arranged so that the cut-off frequencies are set at a value (e.g. 0.1 Hz) which is lower than the sprung/unsprung stroke frequency range (e.g. 1~10 Hz) caused by vibration which is transmitted from the road surface.

The Xl and $\overline{XL}$ values and XR and $\overline{XR}$ values then subtracted in subtracters 86 and 88 respectively, and the differences $[XL - \overline{XL}]$ and $[XR - \overline{XR}]$ then supplied to absolute value circuits 90 and 92 wherein the absolute values $|XL - \overline{XL}|$ and $|XR - \overline{XR}|$ are obtained. These values are supplied to the mode determining circuit 78. In this case the mode determining circuit 78 includes a microprocessor equipped with a memory (e.g. ROM) in which a mode map of the nature shown in FIG. 4 is recorded.

Figure 6:
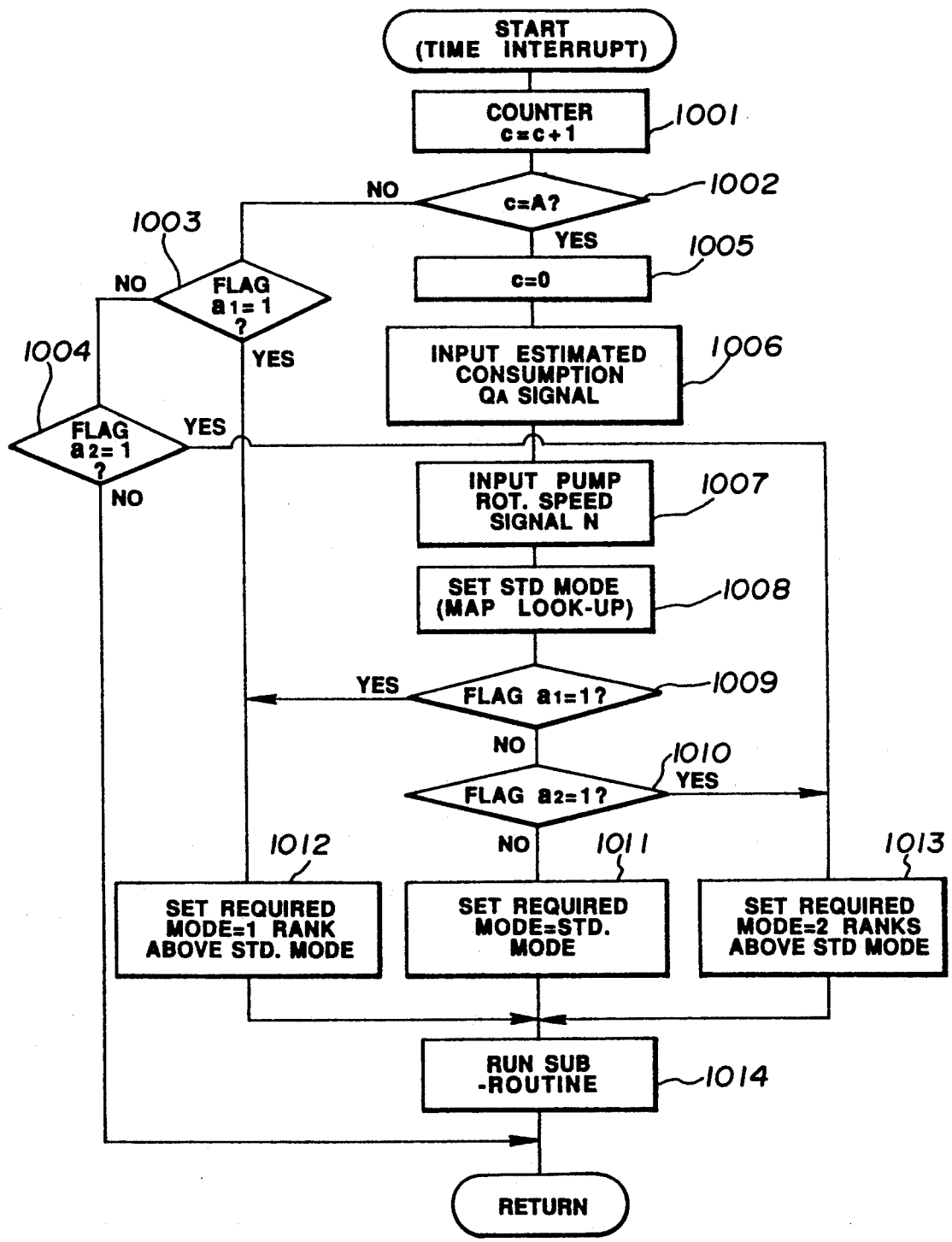
FIGS. 6–8 are flow charts which shows the steps which are executed in accordance with control routines which characterize a first embodiment of the present invention.
Figure 7:
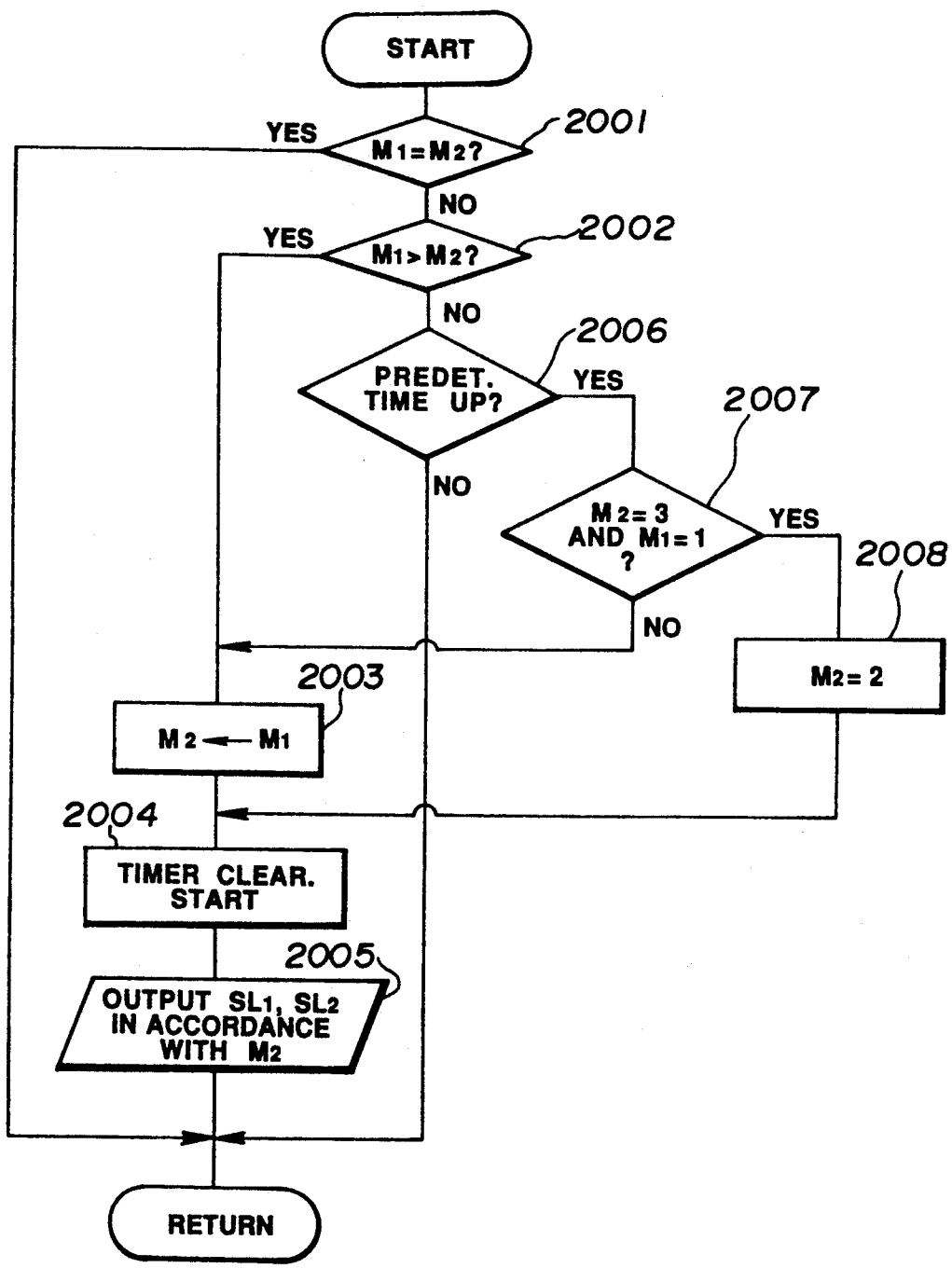
Figure 8:
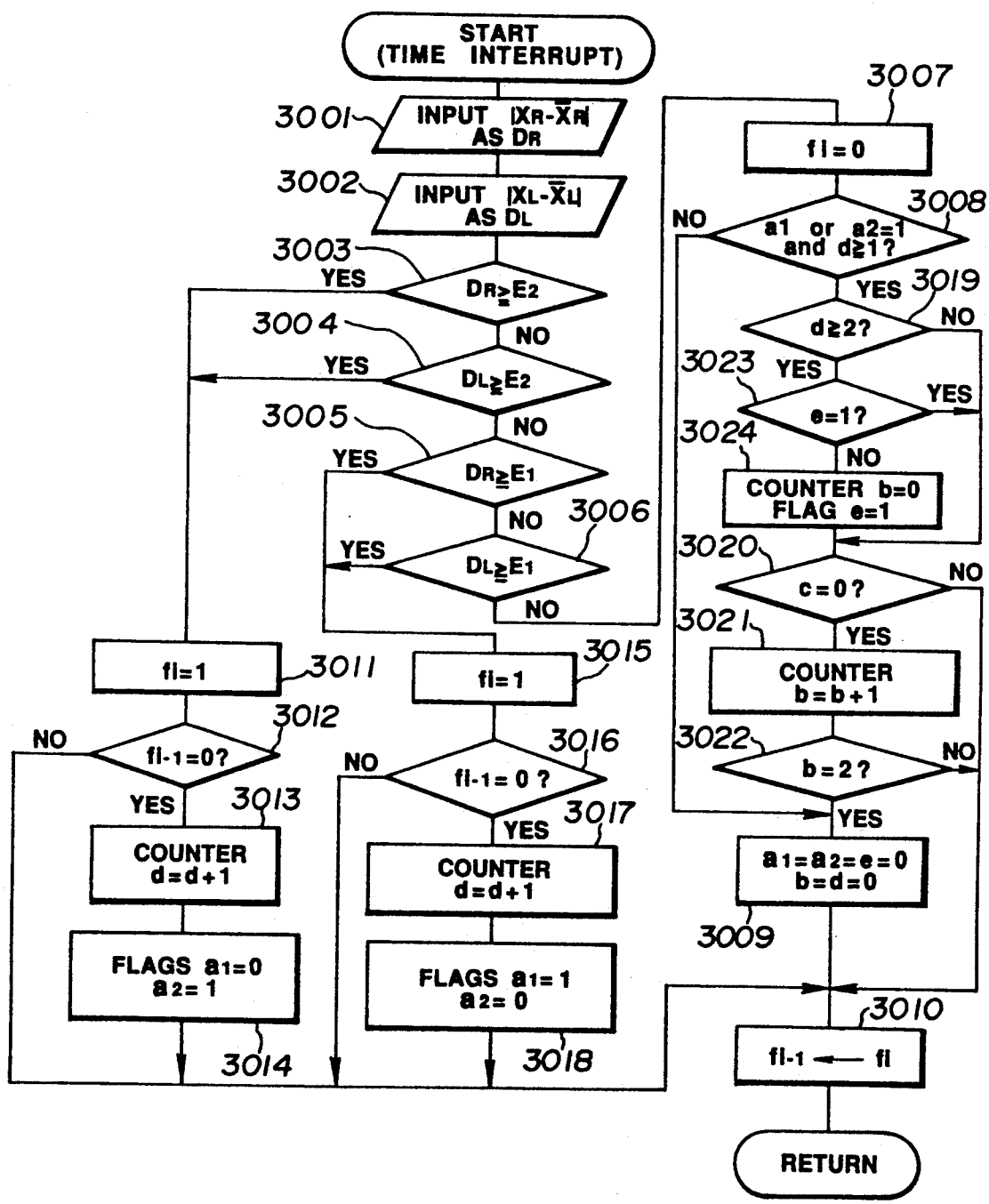

FIGS. 6 to 8 show routines according to a first embodiment of the invention which are run in the above mentioned microprocessor at predetermined time intervals $\Delta t$ (<T). Of these, the routine shown in FIG. 6 is such as to set the required mode at the same timing as an integration time expires. The flow chart shown in FIG. 7 shows the steps which characterize the sub-routine which is run in a step of the routine of FIG. 6 and is such as to determine the setting of the SL1 and SL2 signals which determine the control of the valve solenoids. The routine shown in FIG. 8 is such as to discriminate between large, intermediate and small amounts of suspension stroke amounts and set flags which indicate the same.

OPERATION

The operation of the mode determining circuit 78 is such that at predetermined intervals $\Delta t$—for example 20 msec the routines shown in FIGS. 6 and 8 are run via timer interrupt. It will be noted that the flags a and e and the counters b, c and d are rest to zero by the main program each time the necessary calculations are completed.

More specifically, the first 1001 step of the FIG. 6 routine is such as to increment a counter c. At step 1002 the count of counter c is compared with a value A to determine if the integration time T has lapsed or not (viz., $T = \Delta t \cdot A$). In the event that the c count has not reached A the routine goes across to step 1003 wherein the status of a flag a1 is determined. In the event that this flag has not yet been set, the routine goes to step 1004 wherein the status of a flag a2 is checked. Flags a1 and a2 are set in the routine shown in FIG. 8 and are such that when the stroke of the hydraulic cylinder 10 is such as to exceed a predetermined value E2 (viz., exhibit a large stroke) a first predetermined time after such an event is detected the flags are set such that $a1 = 0$ and $a2 = 1$. In the event that the stroke falls within predetermined limits E2 and E1 the flags are set $a1 = 1$, $a2 = 0$ following the lapse of the same predetermined period, while in the event that the stroke is found to be less than E1 both flags are cleared (Viz., $a1 = 0$, $a2 = 0$) following the lapse of a second predetermined period.

In steps 1003, and 1004, in the event that the outcome of the enquiry is negative, it is deemed that the stroke amount is small, the instant mode is maintained and the routine returns to the main program.

However, in the event of a positive (YES) outcome in step step 1002, the routine goes to step 1005 wherein counter c is cleared and then proceeds to step 1006. In steps 1006 and 1007 the estimated hydraulic fluid requirement value QA and the pump rotational speed value N are input.

At step 1008 mapped data the nature of which is shown in FIG. 4 is used to with the values of QA and N which have just been obtained in order to determine which mode of operation Mo should be selected as a standard (STD) under the instant set of operating conditions.

Following this decision, the routine goes to step 1009 wherein the status of flag a1 is checked. In the event that $a1 = 0$ (viz., the flag has not been set) then the routine goes to step 1010 wherein the status of flag a2 is determined. Viz., steps 1009 and 1010 are used to determine if the stroke amount is large, small or intermediate. In the event that both steps exhibit negative outcomes (indicative of a small stroke amount) the routine flows to step 1011 wherein the STD mode Mo determined by the look-up executed in step 1008 is set as the mode M1 which is anticipated or "predicted" as being suitable to meet current requirements.

In the event that the outcome of step 1009 is affirmative (indicative of an intermediate stroke amount) the routine goes to step 1012 wherein the mode Mo is upgraded by one rank and set as the required mode M1 (viz., mode 1 is upgraded to mode 2 or alternatively mode 2 is raised to mode 3). On the other hand, if the outcome of step 1009 is negative and the routine flows to step 1010 wherein in the event of an affirmative outcome (flag a2=1), is assumed that the stroke amount is large and the routine goes across to step 1013 wherein the STD mode Mo is upgraded by two ranks. As will be appreciated, as there is only 3 modes from which to select, step 1013 is such as to unfailingly induce the situation wherein mode 3 is elected.

Step 1014 which follows steps 1011, 1012 and 1013 is arranged to induce the running of a sub-routine of the nature shown in FIG. 7. This sub-routine is such as to change the instant used mode to that which has been set in which ever of steps 1011, 1012 and 1013 the routine has passed through.

As will be appreciated, the first step 2001 of this sub-routine is such as to determine if M1=M2 or not. Viz., determines if the mode currently being used and the predicted one are the same or not. In the event that there is no difference then need for change is absent and the routine returns. However, when a difference is noted the routine proceeds to step 2002 wherein it is determined if M1>M2 or not. In the event that M1<M2 the routine goes to step 2006 wherein it is determined if the M1 is larger or smaller than M2. In the event that M1 is larger than M2 the routine goes to step 2003 wherein a command to set M2=M1 is issued. Following this, the routine then flows through steps 2004 and 2005 wherein a timer is cleared and restarted, and command signals SL1 and SL2 are generated and output to the driver circuits 80A, 80B. As will be understood, this output results in suitable solenoid switching signals CS1 and CS2 being generated and applied to the appropriate solenoids.

Figure 9A:
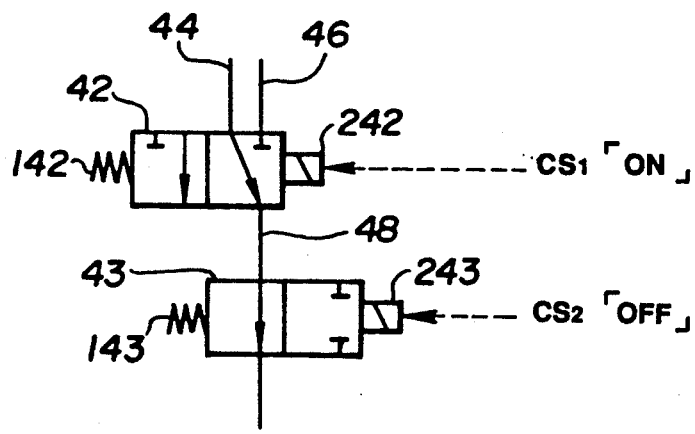
FIGS. 9(a)-(c) are diagrammatic representations which show the manner in which the control valve arrangement used to control the draining of the pump discharge is disposed in accordance with the first embodiment of the present invention.
Figure 9B:
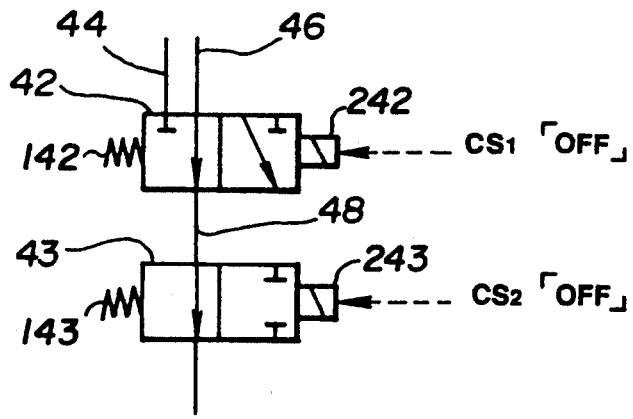
Figure 9C:
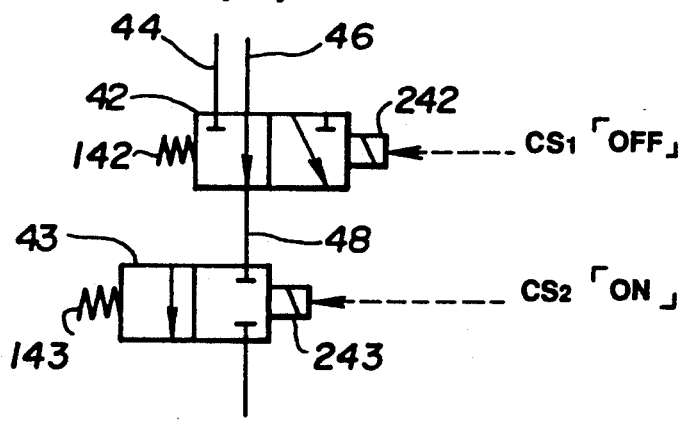

As a result of the above signal generation, the situations schematically illustrated in FIGS. 9(a)-9(c) can be selectively achieved. That is to say, when the CS1 assumes a high level (ON) and CS2 assumes a low level (OFF) the situation wherein the spool of valve 42 assumes a position wherein the first drain conduit 44 is selected and spool of the second electromagnetic valve 43 assumes a position wherein the third drain conduit is open and hydraulic fluid the larger of the two pumps 34A can be drained to the reservoir 30. Under these conditions the relatively small output of the second smaller pump 34B is supplied to the pressure control valves 12. Viz., mode 1 is induced.

However, in the event that both the CS1 and CS2 signals assumes a low level (OFF) the situation shown in FIG. 9(b) is induced. Under these conditions the spool of the first electromagnetic valve 42 assumes a position wherein the second drain conduit 46 is selected and the first one closed. This of course permits the output of the small pump 34B to be drained and the output of the larger one 34A to be supplied to the pressure control valves 12. This of course constitutes mode 2.

On the other hand, in the event that CS1 assumes a low level (OFF) and CS2 assumes a high one (ON), the situation wherein the second drain conduit 46 is selected by the first valve but the second valve closes the third drain conduit 48. As a result no hydraulic fluid is drained and the output of the both pumps are supplied to the pressure control valves 12 thus inducing mode 3.

Returning to FIG. 7 in the event that the outcome of step 2002 is negative indicating that M1<M2 (viz., the instant mode M2 is larger than that (M1) indicated as being necessary) then the routine flows to step 2006 wherein the count of the timer which is cleared and started in step 2004, has reached a predetermined count indicative of a predetermined time period T (e.g. 2 seconds). In the event that the count for time T has not been reached, the routine returns. However, upon the appropriate count being clocked, the routine flows to step 1007 wherein it is determined if M2=3 and M1=1. Viz., is determined if the mode which is currently in use is mode 3 and the mode which is estimated as being required for the instant set of operational conditions is mode 1. In other words it is determined if a 3-1 mode shift is required or not.

As will be appreciated, this shift is such as to require that the valve conditioning shown in FIG. 9(c) should be changed to that shown in FIG. 9(a). This of course would involve the spools of both valves 42 and 43 be shifted from their current positions. Under these conditions the spool of the second electromagnetic valve 43 is moved in a first direction (rightward in FIG. 9(a) under the influence of the spring 143 associated therewith in response to de-energization of solenoid 243 while the spool of the first electromagnetic valve 42 is moved in the opposite direction against the bias of the spring 142 associated therewith in response to energization of solenoid 242.

However, unless measures are taken there is no guarantee that the first electromagnetic valve 42 will not assume a condition wherein the drain conduit 44 of the larger pump is not selected prior to the second valve 43 being conditioned to assume an open position. Accordingly, as disclosed above in connection with the prior art, it is possible that the spool of the second valve 43 will be moved toward its open position under conditions in which it will be exposed to the larger of the two flows and therefore be subject to the larger of the two flow generated forces and that this will tend to bias the spool back toward its closed position. To guarantee that the spool of the second electromagnetic valve 43 will be moved to the required open position it has been hitherto necessary to ensure that the spring/solenoid arrangement be sufficiently powerful as to assuredly move the spool against the maximum possible resistance likely to be encountered.

The instant embodiment overcomes this problem by ensuring that the conditions illustrated in FIG. 9(b) are established before the command to open the second electromagnetic valve 43 to the larger flow from drain conduit 44 to permit draining therefrom is issued. This of course means that under no circumstances will the spool of the second valve be exposed to a flow other than that produced by the smaller of the two pumps before it opens the third drain conduit 48. This in turn permits the spring/solenoid arrangement used to motivate the spool of the second valve 43 to be notably reduced in size and power. By way of example, in the event that the larger pump 34A is arranged to exhibit a displacement of 10 liter/min and the smaller pump 34B to exhibit a displacement of 5 liter/min, the size of the spring/solenoid arrangement for the second valve 43 can be approximately halved.

Accordingly, in connection with the instant embodiment, in the event that it is found that a 3-1 mode shift is required in step 2007, the routine flows to step 2008 wherein M2 is set to 2 and thus induce the situation wherein a 3-2, 2-1 stepwise two stage step takes place. After the setting of M2=2 step 2008 the routine flows to step 2004 wherein the T timer is cleared and restarted. Until T is counted up again, the system is conditioned to produce mode 2. Upon time T expiring, the routine is permitted to flow from step 2007 to step 2003 and thus induce a 2-1 mode shift.

In the routine shown in FIG. 8, the first two steps 3001, 3002 is such as to read in the instant values of $|XL-\overline{XL}|$ and $|XR-\overline{X}|$ and respectively set the same as values DL and DR. At steps 3003 and 3004 the just obtained DR and DL values are compared with the above mentioned predetermined stroke value E2. In the event that neither are equal to or greater than E2 (indicating the absence of a large stroke amount), the routine flows to steps 3005 and 3006 wherein the values of DR and DL are compared with the stroke value E2 in order to determine if either of the stroke amounts falls in the intermediate range. In the event that neither of DR, DL are greater than or equal to the E1 value it is deemed that the stroke amount for all four wheels is small and the routine proceeds to step 3007 wherein a conversion factor f is set fi=0. It will be noted that this conversion factor is indicative of whether a mode upgrade is required or not. In the case of a 0 setting, no upgrade is indicated. On the other hand, as will be noted later, in response to either large or intermediate stroke detections, fi is set to 1.

Next, at step 3008 it is determined if either one of flags a1 and a2 have been set to 1 and the counter d exhibits a value greater than 1. It will be noted that counter d is a counter which counts up the number of runs which have occurred with either of large or intermediate stroke amount detections.

In the event that these conditions are not met (NO) the routine by-passes steps 3019, 3023, 3024, 3020, 3021 and 3022 and goes directly to step 3009. In step 3009 the flags a1, a2 and e and counters b and d are all cleared and the routine returns after passing through step 3010 wherein the instant fi value is set in memory as fi−1 (the fi value for the previous run).

However, in the event of a positive (YES) outcome in either of steps 3003 or 3004 the routine goes to step 3011 wherein the conversion factor fi is set to 1 and then proceeds to step 3012 wherein it is determined if the fi−1=0 or not. Step 3012 is such as to determine if the stroke amount has changed from a small amount to a large amount or not. In the event that such as change is not determined (NO) the routine need not pass through step 3014 and returns after passing through step 3010.

On the other hand, in the event of an affirmative outcome in step 3012 the routine is directed to step 3013 wherein the d counter is incremented so as to indicate the presence of a large stroke amount. Following this at step 3014 flag a1 is set to zero and a2 is set to 1 in order to flag the detection of a large stroke amount. After this setting the routine returns via step 3010.

It should be noted that if the decisions at steps 3003 and 3004 are both negative (NO) and one of the decisions at steps 3004 and 3005 is positive (YES) then the routine will go to steps 3015 to 3019. These steps are basically similar to 3011-3014 and differ in that flags a1 and a2 re set such that a1=1 and a2=0.

In summary, by comparing the values of DR and DL with E1 and E2 it is possible to determine and flag the presence of large, intermediate and small stroke amounts.

At step 3008 if the outcome is YES the routine goes to step 3019 wherein it is determined if counter d has reached and/or exceeded 2 or not. It will be noted that the counter d is incremented in steps 3013 or 3018 and is indicative that the vibration is tending to concentrate in the large/intermediate stroke ranges.

In the event of a negative outcome, the routine goes to step 3020 wherein it is determined if the count of counter c is zero or not. Viz., determine if the integration time clocked in step 1001 has expired or not. In the event that c is not zero the routine returns via step 3010. On the other hand, in the event that c=0 the routine goes to step 3021 wherein counter b is incremented. Following this, at step 3022 it is determined if the count of b has reached 2 or not. The decision which is made in step 3022 is such to ensure that the upgraded mode is maintained for at least one period T. In the event that step 3022 renders a negative outcome, it is deemed that a hold time Tf+T(0≤Tf<T: Tf and which varies with the timing with which the stroke amount falls out of the large/intermediate region) has not yet been exceeded and the routine goes to step 3010.

On the other hand, in the event of a positive (YES) outcome in step 3019 during the above mentioned hold time Tf+T the stroke condition has changed from large or intermediate to a small stroke condition. Accordingly, the routine flows to step 3023 wherein the status of flag e is checked. In the event that flag e has not been set the routine goes to step 3024 wherein counter b is cleared and flag e is set (e=1). In the event of an affirmative finding in step 3023 the routine by-passes step 3024 and goes directly to step 3020.

As will be appreciated, the length of the above mentioned hold time can be freely set in response to the vibration frequency and the amount of power consumed.

The overall operation of the above described embodiment is such that when the vehicle is running along a smooth road the operate check valve 41 is open and the relief valve 53 functions to control the pressure generated by the pump arrangement 34 in a manner to supply a predetermined level of line pressure to the active suspension 6.

Under these conditions, the vibration which is transmitted to the chassis from the road surface induces very little change the amount of stroke. As a result, the outputs XL and XR of the stroke sensors 58FL and 58FR exhibit almost no change. As a result QA≈Qo. Further, $|XL-\overline{XL}| \approx 0$ and $|XR-\overline{XR}| \approx 0$ and $|XL-\overline{XL}| < E1$ and $|XR-\overline{XR}| < E1$. Therefore, flags a1 and a2 are both cleared in step 3009 of the routine shown in FIG. 8. On the other hand, mode determination circuit 78 is such that in accordance with the steps 1006–1008 of the routine shown in FIG.6 are such as to read in the pump rotational speed N, the estimated consumption indicative value QA and to determine the STD mode each time period T. As both of the flags a1 and a2 are zero at such a time the required mode and the STD mode are both set at 1. According to this setting the signals CS1 and CS2 assume ON and OFF levels respectively and the valves 42 and 43 assume the conditions illustrated in FIG. 9(a) and thus conditions the hydraulic fluid source to operate under mode 1 status. In other words the output of the larger pump 34A is drained while the output of the smaller pump 34B is supplied to the active suspension arrangement in a manner to establish a suitable line pressure.

Under these conditions, as the amount of hydraulic fluid which is consumed by the suspension cylinder 10 is small, the amount of power consumed by the pump arrangement to output the required amount of hydraulic fluid is also accordingly small.

When the conditions change in a manner wherein low frequency undulations are encountered and even through some stroke difference is produced still $|XL-\overline{XL}|<E1$ and $|XR-\overline{XR}|<E1$. Accordingly, both flags a1 and a2 remain at 0 and mode 1 operation is maintained and any additional hydraulic fluid that is required is supplied from the accumulator 52.

However, when $|XL-\overline{XL}|\geq E1$ and $|XR-\overline{XR}|\geq E1$ at least one of the flags a1 and a2 is set. Under these conditions the STD mode is upgraded by either 1 or 2 levels in one of steps 1011 or 1011. When mode 2 operation is induced, the valves 42, 43 are conditioned to assume the status indicated in FIG. 9(b). The output of the smaller pump 34B is drained and the output of the larger one 34A used in place thereof for the purposes of producing line pressure. This of course removes the load of the smaller pump 34B from the prime mover (engine 36) and establishes a condition wherein the only the pump 34A consumes power output by the engine.

In the event that mode 3 is induced, the valves 42, 43 assume the conditions illustrated in FIG. 9(c). Under these conditions neither of the pump outputs are drained the total output of both are used to establish and maintain the supply of line pressure.

Thus, in accordance with this instant embodiment, in accordance with the initial value of vertical vibration input a command to upgrade the control mode is issued with suitable timing and delay in the actual hydraulic fluid supply increase is obviated.

SECOND EMBODIMENT

Figure 10:
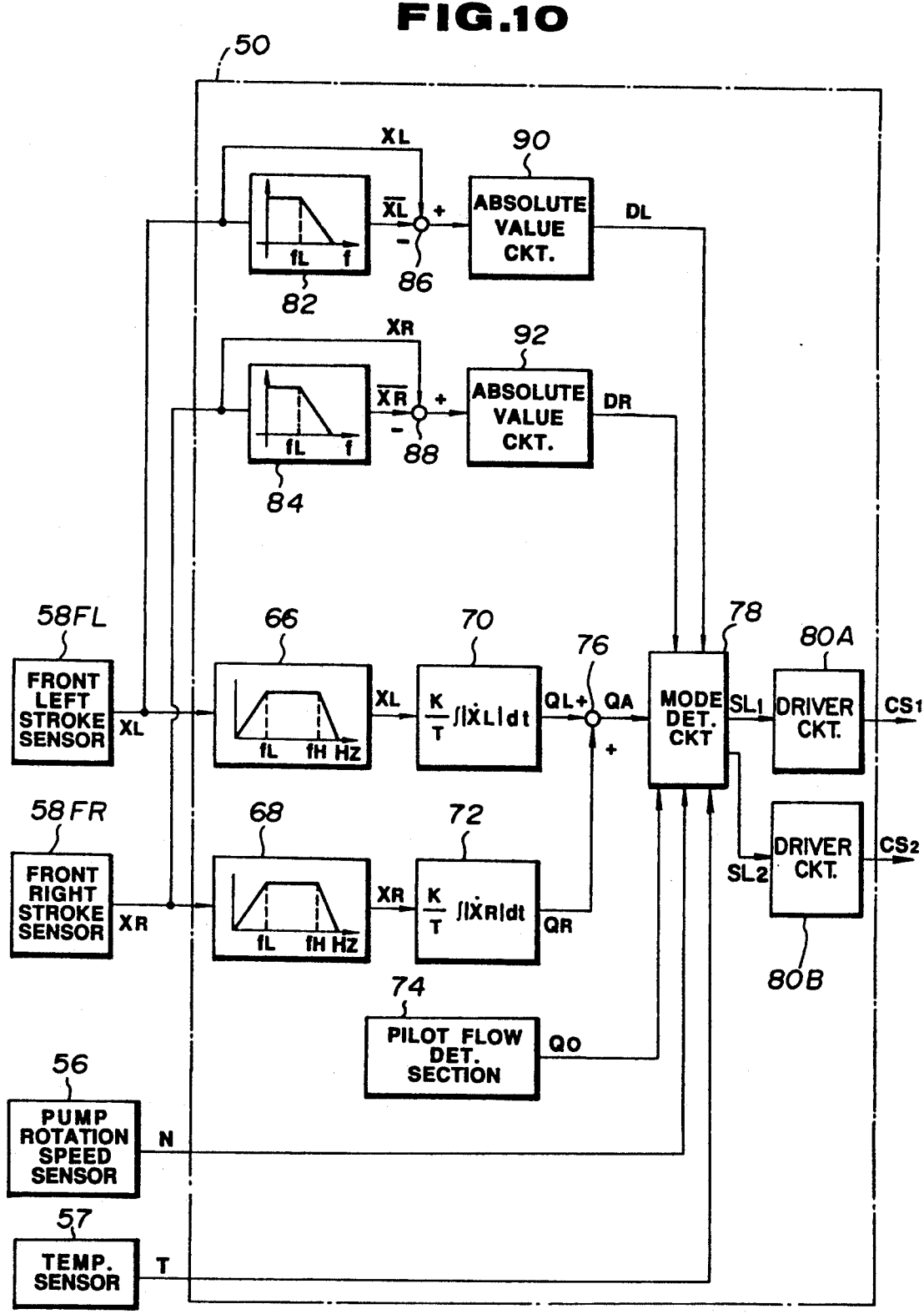
FIG. 10 is a block diagram showing the conceptual arrangement of a control circuit which characterizes a second embodiment of the present invention.

FIG. 10 shows a circuit arrangement according to a second embodiment of the present invention. As will be apparent, this arrangement differs from the one shown in FIG. 5 in that a temperature sensor 57 is additionally provided and the output of the pilot flow determination section is supplied directly to the mode determination circuit instead of being added to the QR and QL values at adder 76.

Figure 11:
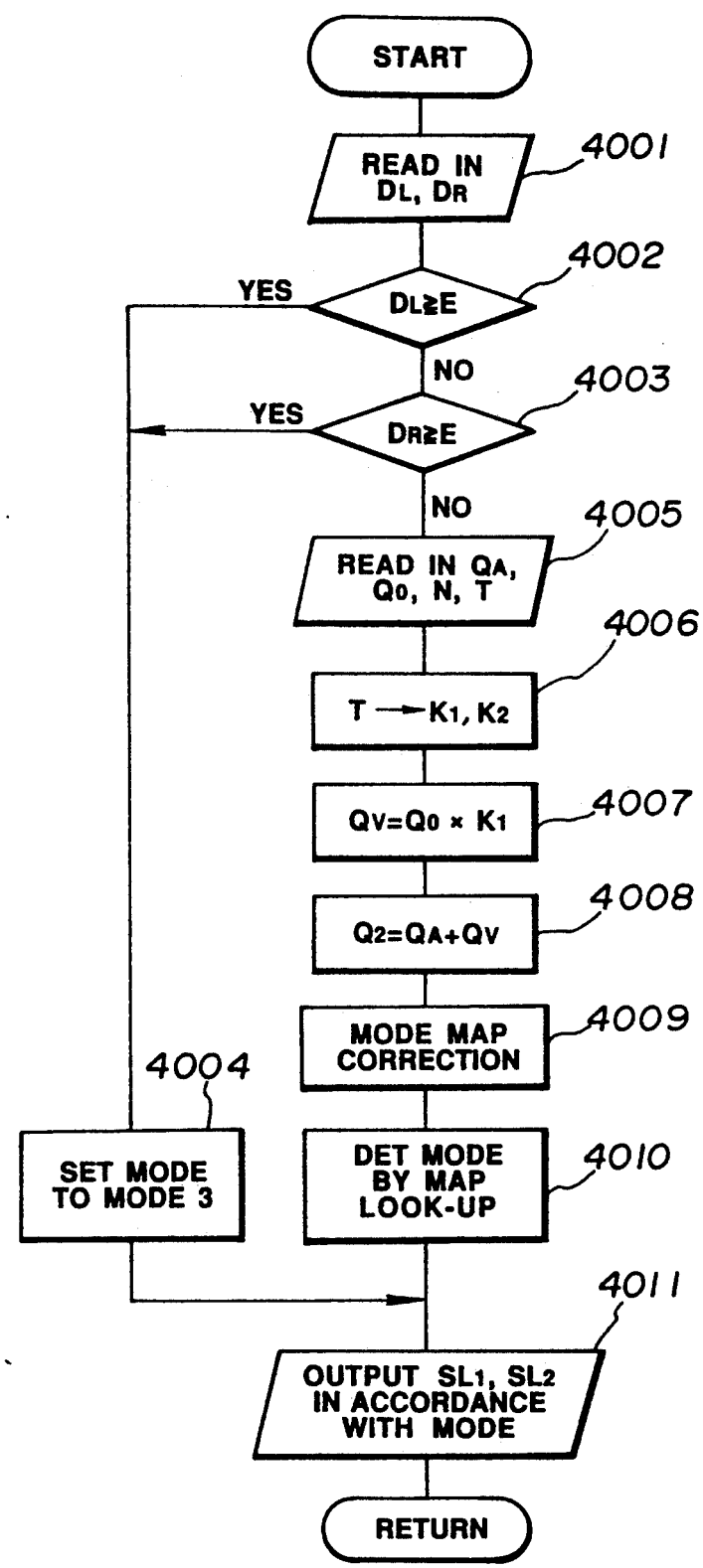
FIG. 11 is a flow chart which shows a control routine which characterizes the operation of the second embodiment of the present invention.
Figure 12:
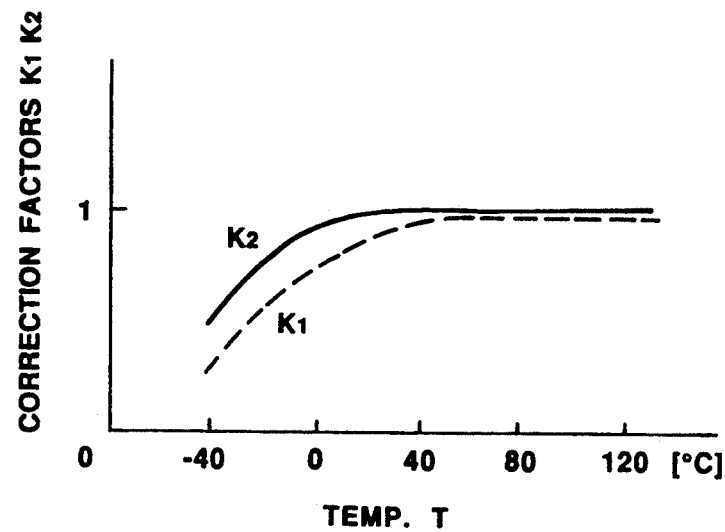
FIG. 12 is a graph showing the manner in which temperature related correction factors K1 and K2 which are used in the second embodiment of the invention, vary with increase in temperature.
Figure 13:
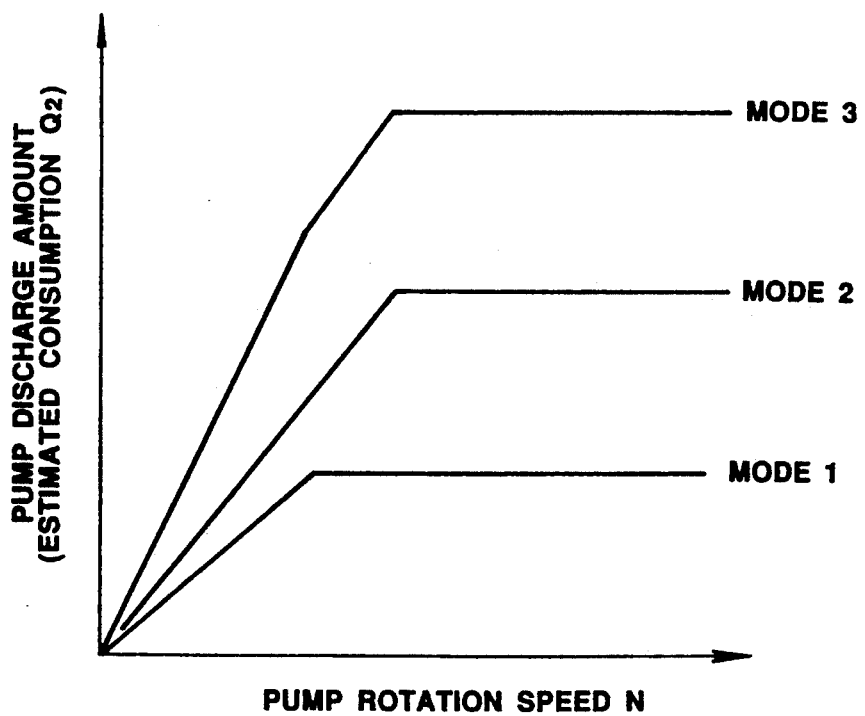
FIG. 13 is an example of a mode control map which can be used in the second embodiment.

FIG. 11 shows in flow chart form the steps which characterize the operation of the second embodiment. The first step 4001 of this routine is such as to read in the instant DL and DR values. These value are the same as those used in the first embodiment. Viz., $DL=|XL-\overline{XL}|$ and $DR=|XR-\overline{XR}|$. At steps 4002 and 4003 these value are compared with a predetermined value E in order to determine if the stroke amount is large or not. In the event of a positive outcome the routine goes to step 4004 wherein the mode is set to mode 3. However, if the outcome of steps 4002 and 4003 are both negative, the routine goes to step 4005 wherein the instant values of QA, Qo N (pump rotational speed) and Te hydraulic fluid temperature) are read in. In step 4006 the temperature value Te is used to obtain a pilot flow correction factor K1 and a pump output amount correction factor K2. It should be noted that both the operational characteristics of the pressure control valves 12 and the pump arrangement 34 vary with temperature and are influenced by the type of valve and the type of pump. FIG. 12 shows an example of how K1 and K2 can vary with temperature for predetermined types of valve and pump. Data of the nature depicted is stored in a ROM which forms part of a microprocessor which is included in the mode determination circuit 78. After the appropriate K1 and K2 values for the instant system are obtained by means of table look-up (for example), the routine proceeds to step 4007 wherein the pilot flow amount Qo is corrected via the application of the first correction factor K1 in a manner to obtain a temperature corrected pilot flow amount Qv. Following this at step 4008 a corrected estimate of the amount hydraulic fluid which is required is derived by summing the QA value output by the adder 76 and corrected pilot flow amount Qv.

Next in step 4009 one of a plurality of mode maps of the nature depicted in FIG. 4 (save that Q2 replaces QA), which are stored in the above mentioned ROM, is selected. By way of example, it is within the scope of the invention to provide at least three maps, one for low temperature ranges, one for intermediate temperatures and a third for higher temperatures and to use the instant Te value to select the same. Alternatively, and/or in addition to the above, it is possible to modify the Q2 value derived by summing QA and Q0, with the second correction factor K2 before using the selected map data. It is of course possible in the latter instance to dispense with the plurality of maps and use a single one in a manner basically similar to the first embodiment.

In step 4010 the mode which is required under the instant set of operating conditions is determined by map look-up and in step 4011 the mode which is selected in which ever of steps 4004 and 4010 the routine has passed through on the instant run is set and used to outputs signals SL1 and SL2.

While the second embodiment is such that measures are not exacted in order to ensure that the valves are conditioned for mode 2 before the second electromagnetic valve 43 is conditioned to open, is not shown, it is deemed an obvious manner for one skilled in the art to be able to introduce the instant temperature correction steps into steps 1006–1008 of the routine shown in FIG. 6 for example.

THIRD EMBODIMENT

The third embodiment is directed to solving the problem wherein upon the rotational speed thereof entering a high speed zone the second electromagnetic valve 43 is prevented from closing and thus preventing the problem wherein the of the pumps 34A and 34B exhibits a resistance to rotation which is so great that the belt tends to undergo slippage. To achieve this the second embodiment is such feature the monitoring of the pump rotational speed and preventing the second electromagnetic valve 43 from assuming a state wherein drainage of hydraulic fluid therethrough is prevented.

Figure 14:
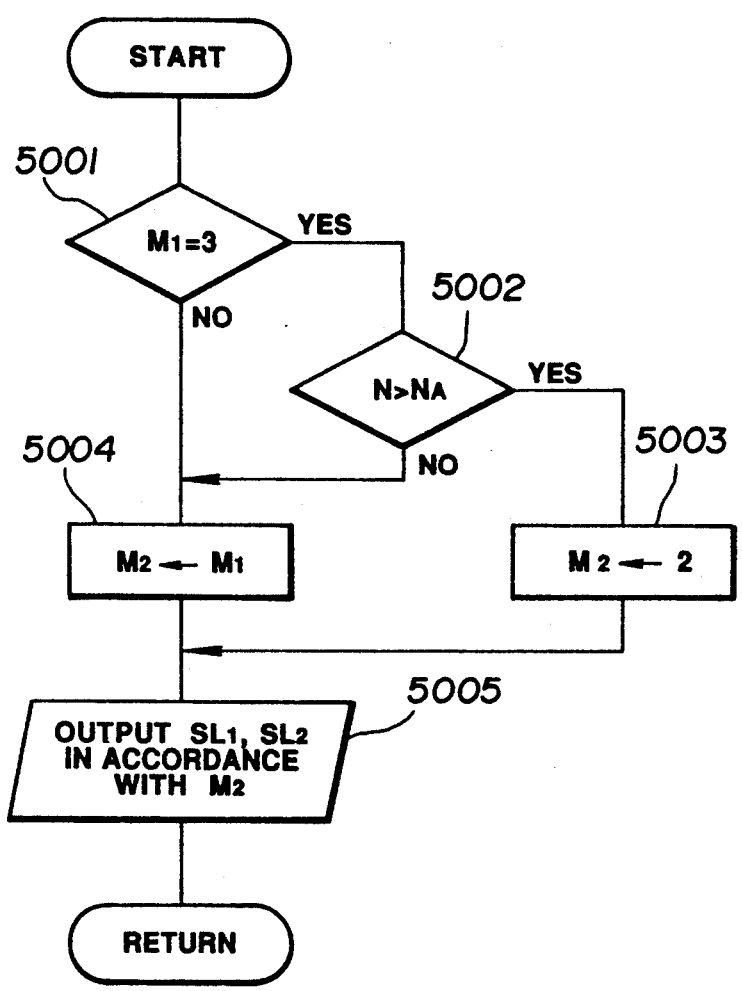
FIG. 14 is a flow chart which shows a routine which is used in connection with a third embodiment.

More specifically, a sub-routine of the nature depicted in FIG. 14 is run in step 1014 of the routine shown in FIG. 6 in place of, or in addition to, the sub-routine of FIG. 7. As shown the first step of this routine is such as to determine if the required mode M1 has been set to mode 3 or not. In the event that it has, the routine goes to step 5002 wherein the instant pump speed N is compared with a predetermined upper limit NA. It will be noted that as there is a direct relationship between the pump rotational speed and the engine speed, it can be taken that a positive outcome in step 5002 is indicative that the engine is currently rotating in a high speed range.

In the case N>NA (viz., a positive outcome) the routine goes to step 5003 wherein a command to set M2 to mode 2 is issued. As will be appreciated, this prevents the actually used mode from being upgraded to mode 3 while the rotational speeds of the pumps and the engine are above a predetermined level whereat belt slippage and the like type of stress and wear is apt to take place.

On the other hand, in the event that N has not yet exceeded NA, the routine goes to step 5004 wherein a command to set the actual mode M2 to the instant value of M1 is generated.

Following this, the routine goes to step 5005 wherein the signals SL1 and SL2 are generated in accordance with the newly set M2 value.

On the other hand, in the event that the outcome of step 5001 is such as to indicate that M1 has not been set to mode 3 the routine goes directly to step 5004.

With the second embodiment, as mode 3 cannot be set while the pump speed is detected as being above the NA level, the second electromagnetic valve 43 cannot be conditioned to close the third drain conduit 48. This of course means that one of the pumps will be constantly be placed in fluid communication with the reservoir 30 and the load on the pump input shaft reduced to a level whereat the slippage problem will not be encountered. It will of course be realized that while the pumps are being driven at high speed the amount of hydraulic fluid which is discharge from the larger of the two will be sufficient to establish and maintain the line pressure level required for normal operation of the active suspension or the like type of system which is being supplied with hydraulic fluid.

A will be appreciated, the present invention is not limited to the specific embodiments which have been disclosed above and various combinations and variations can be made without departing from the scope of the present invention which is defined by the appended claims.

What is claimed is:

1. A source of hydraulic fluid under pressure comprising:
   a first pump;
   a first supply passage which is associated with said first pump and which receives the discharge thereof;
   a first check valve disposed said first supply passage;
   a second pump which has a smaller capacity than said first pump;
   a second supply passage which is associated with said second pump and which receives the discharge thereof;
   a second check valve disposed in said second supply passage;
   a first drain passage which leads from said first supply passage at a location between said first pump and said first check valve;
   a second drain passage which leads from said second supply passage at a location between said second pump and said second check valve;
   drain passage control means for controlling the communication between said first and second drain passages and a reservoir;
   said drain passage control means including:
   first and second valves, said first valve being connected with said first and second drain passages and said second valve being fluidly interposed between said first valve and a reservoir, said first valve having a first state wherein said first drain passage is open and said second drain passage is cut-off, and a second state wherein said first passage is cut-off and said second drain passage is open,
   said second valve having a first state wherein communication between the first valve and the reservoir is permitted and a second position wherein communication between said first valve and the reservoir is cut-off;
   valve control means operatively connected with said first and second valves, said valve control means conditioning said first valve to assume its second state before said second valve is switched from its second state to its first state.

2. A source of hydraulic fluid under pressure as claimed in claim 1 wherein said control means controls said first and second valves so that, before either of the first and second valves can be switched in a direction which increases the amount of fluid which is returned to the reservoir, it is maintained in its instant conditions for a predetermined period.

3. A source of hydraulic fluid under pressure comprising:
   a first pump;
   a second pump, said second pump having a discharge capacity which is less than that of the said first pump;
   a first discharge passage into which the first pump discharges its output;
   a second discharge passage into which the second pump discharges its output;
   a supply conduit which fluidly communicates with the first and second discharge passages;
   a first drain passage which communicates with said first discharge passage at a location upstream of a first check valve which is disposed in the first discharge passage at a location upstream of the supply conduit;
   a second drain passage which communicates with said second discharge passage at a location upstream of a second check valve which is disposed in the second discharge passage at a location upstream of the supply conduit;
   a first spool valve which fluidly communicates with the first and second drain passages, said first spool valve having a first drain port;
   a second spool valve fluidly communicated with the discharge port of said first spool valve, said second spool valve having a second drain port;
   said first valve having a first spool which can assume a first position in which communication between the first drain passage and the first drain port is established and a second position wherein communication between the second drain passage and the first drain port is established,
   said second valve having a second spool which can assume a first position wherein communication between the first and second drain ports is established and a second position wherein communication between the first and second drain ports is cut-off;
   hydraulic fluid requirement sensor means;
   a temperature sensor for sensing the temperature of the hydraulic fluid; and
   control means which is operatively connected with said first and second spool valves for controlling the positions of the first and second spools, said control means including:

means for determining the amount of hydraulic fluid which is required to be supplied into said supply conduit from said first and second pumps, based on the input from said hydraulic fluid requirement sensor means and said temperature sensor; and means for conditioning the first and second valves in accordance with the determined amount of hydraulic fluid required.

4. A source of hydraulic fluid under pressure as claimed in claim 3 further comprising:

drive means for operatively connecting a prime mover with said first and second pumps; and means for sensing a rotational speed indicative of the rotational speed of one of the pump and the prime mover;

said control means being responsive to the sensed rotational speed to prevent the second spool from being moved to its second position when the rotational speed is above a predetermined level.

5. A source of hydraulic fluid under pressure as claimed in claim 3 wherein said control means moves the first spool to its second position before moving the second spool of said second spool valve from its second position to its first position.

6. A source of hydraulic fluid under pressure as claimed in claim 5 wherein said control means moves the second spool of said second spool valve from its second position to its first position a predetermined time after moving the spool of the first valve to its second position.

7. A source of hydraulic fluid under pressure comprising:

a first pump;

a second pump, said second pump having a discharge capacity which is less than that of the said first pump;

a first discharge passage into which the first pump discharges its output;

a second discharge passage into which the second pump discharges its output;

a supply conduit which fluidly communicates with the first and second discharge passages;

a first drain passage which communicates with said fist discharge passage at a location upstream of a first check valve which is disposed in the first discharge passage at a location upstream of the supply conduit;

a second drain passage which communicates with said second discharge passage at a location upstream of a second check valve which is disposed in the second discharge passage at a location upstream of the supply conduit;

a first spool valve which fluidly communicates with the first and second drain passages, said first spool valve having a first drain port;

a second spool valve fluidly communicated with the discharge port of said first spool valve, said second spool valve having a second drain port;

said first valve having a first spool which can assume a first position in which communication between the first drain passage and the first drain port is established and a second position wherein communication between the second drain passage and the first drain port is established, said second valve having a second spool which can assume a first position wherein communication between the first and second drain ports is established and a second position wherein communication between the first and second drain ports is cut-off;

drive means for operatively connecting a prime mover with said first and second pumps; and means for sensing a rotational speed indicative of the rotational speed of one of the pump and the prime mover;

control means which is responsive to the sensed rotational speed for preventing the second spool from being moved to its second position when the rotational speed is above a predetermined level.

* * * * *